US012695118B2

(12) United States Patent
Matsubara et al.

(10) Patent No.: US 12,695,118 B2
(45) Date of Patent: Jul. 28, 2026

(54) SECONDARY BATTERY

(71) Applicant: Panasonic Intellectual Property Management Co., Ltd., Osaka (JP)

(72) Inventors: Kenji Matsubara, Osaka (JP); Kazuhiro Iida, Nara (JP); Masanobu Takeuchi, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1072 days.

(21) Appl. No.: 17/442,031

(22) PCT Filed: Jan. 27, 2020

(86) PCT No.: PCT/JP2020/002666

§ 371 (c)(1),
(2) Date: Sep. 22, 2021

(87) PCT Pub. No.: WO2020/198509

PCT Pub. Date: Oct. 1, 2020

(65) Prior Publication Data

US 2022/0173434 A1 Jun. 2, 2022

(30) Foreign Application Priority Data

Mar. 27, 2019 (JP) ................................ 2019-061485

(51) Int. Cl.
*H01M 10/0567* (2010.01)
*H01M 4/583* (2010.01)
(Continued)

(52) U.S. Cl.
CPC ..... *H01M 10/0567* (2013.01); *H01M 4/5835* (2013.01); *H01M 10/0525* (2013.01);
(Continued)

(58) Field of Classification Search
CPC ......... H01M 10/0567; H01M 10/0525; H01M 10/0568; H01M 10/0569;
(Continued)

(56) References Cited

U.S. PATENT DOCUMENTS

2010/0136427 A1 6/2010 Kondo et al.
2011/0274982 A1 11/2011 Kaneko et al.
(Continued)

FOREIGN PATENT DOCUMENTS

CN 102292856 A 12/2011
CN 107221702 A * 9/2017
(Continued)

OTHER PUBLICATIONS

English translation of Search Report dated Dec. 28, 2023, issued in counterpart CN Application No. 202080024859.X. (3 pages).
(Continued)

*Primary Examiner* — Uyen M Tran
(74) *Attorney, Agent, or Firm* — WHDA, LLP

(57) ABSTRACT

A secondary battery which comprises a positive electrode, a negative electrode, and an electrolytic solution, wherein the electrolytic solution comprises water, a lithium salt, and an additive, the additive including at least one of alkaline-earth metal salts, dicarboxylic acids, carboxylic anhydrides, and organic carbonates, and the negative electrode comprises a negative active material, the negative active material having a silane coupling agent adherent to the surface thereof.

12 Claims, 1 Drawing Sheet

(51) Int. Cl.
*H01M 10/0525* (2010.01)
*H01M 10/0568* (2010.01)
*H01M 10/0569* (2010.01)
*H01M 4/02* (2006.01)

(52) U.S. Cl.
CPC ... *H01M 10/0568* (2013.01); *H01M 10/0569* (2013.01); *H01M 2004/027* (2013.01); *H01M 2300/0051* (2013.01)

(58) Field of Classification Search
CPC ... H01M 2300/0051; H01M 2004/027; H01M 4/5835
See application file for complete search history.

(56) References Cited

U.S. PATENT DOCUMENTS

| | | | | |
|---|---|---|---|---|
| 2017/0117582 | A1* | 4/2017 | Mizuno | H01M 10/0525 |
| 2017/0373351 | A1* | 12/2017 | Kawai | H01M 10/26 |
| 2018/0123171 | A1 | 5/2018 | Takechi et al. | |
| 2019/0044190 | A1 | 2/2019 | Yamada et al. | |
| 2019/0074504 | A1 | 3/2019 | Tojigamori et al. | |
| 2019/0088999 | A1 | 3/2019 | Sekiguchi et al. | |

FOREIGN PATENT DOCUMENTS

| | | | | | |
|---|---|---|---|---|---|
| CN | 109524713 | A | | 3/2019 | |
| CN | 107534182 | B | * | 11/2020 | H01M 10/052 |
| JP | 11354104 | A | * | 12/1999 | |
| JP | H11-354104 | A | | 12/1999 | |
| JP | 2001006683 | A | * | 1/2001 | |
| JP | 2007-109549 | A | | 4/2007 | |
| JP | 2018-073819 | A | | 5/2018 | |
| JP | 6423453 | B2 | | 11/2018 | |
| JP | 2019-46687 | A | | 3/2019 | |
| WO | 2009/008280 | A1 | | 1/2009 | |
| WO | 2017/122597 | A1 | | 7/2017 | |

OTHER PUBLICATIONS

English Translation of International Search Report dated Apr. 7, 2020, issued in counterpart Application No. PCT/JP2020/002666. (2 pages).

English translation of Search Report dated Aug. 1, 2024, issued in counterpart CN Application No. 202080024859.X. (3 pages).

* cited by examiner

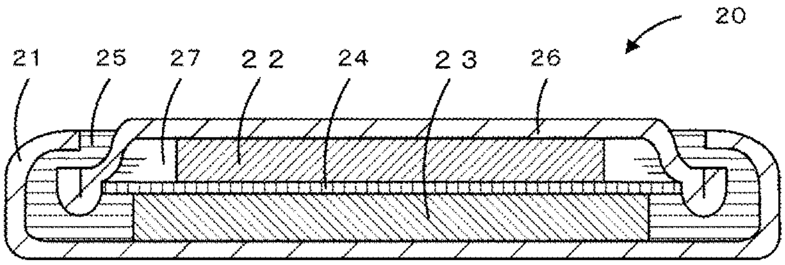
20
21
25
27
22
24
23
26

SECONDARY BATTERY

TECHNICAL FIELD

The present disclosure relates to a secondary battery.

BACKGROUND

As a secondary battery with high output and high energy density, a lithium ion secondary battery is widely used, which includes a positive electrode, a negative electrode, and an electrolyte solution and which performs charging/discharging by moving lithium ions between the positive electrode and the negative electrode. In conventional secondary batteries, an organic-solvent-based electrolyte solution is used in order to achieve a high energy density.

However, organic solvents are generally flammable, so that ensuring safety is an important existing issue. Another problem is that ion conductivity of an organic solvent is lower than that of an aqueous solution, so that rapid charge/discharge characteristics are not sufficiently attained.

In view of the above problems, studies are being conducted on secondary batteries using an electrolyte solution containing water. However, a secondary battery using an electrolyte solution containing water has a narrow potential window, and has difficulties in operating stably under a high voltage.

As one method for solving the problem that the potential window is narrow, for example, Patent Documents 1 and 2 disclose using, as an aqueous electrolyte solution for a secondary battery, an aqueous solution containing an alkaline salt at a high concentration. Further, Patent Document 3 discloses using an electrolyte solution obtained by adding an organic carbonate to an aqueous solution containing an alkaline salt at a high concentration.

CITATION LIST

Patent Literature

Patent Document 1: JP 6423453 B
Patent Document 2: WO 2017/122597 A
Patent Document 3: JP 2018-73819 A

SUMMARY

In secondary batteries using an aqueous electrolyte solution, in order to achieve operation at higher voltages, there is a need for improvement in self-discharge characteristics in addition to extension of the potential window.

Therefore, an object of the present disclosure is to suppress self-discharge in a secondary battery using an aqueous electrolyte solution.

A secondary battery according to a first aspect of the present disclosure includes a positive electrode, a negative electrode, and an electrolyte solution. The electrolyte solution contains water, a lithium salt, and an additive. The additive includes at least one of an alkaline earth metal salt, a dicarboxylic acid, a carboxylic anhydride, and an organic carbonate. The negative electrode includes a negative electrode active material, and a silane coupling agent is adhered to a surface of the negative electrode active material.

A secondary battery according to a second aspect of the present disclosure includes a positive electrode, a negative electrode, and an electrolyte solution. The electrolyte solution contains water, a lithium salt, and an additive. The additive includes at least one of an alkaline earth metal salt, a dicarboxylic acid, a carboxylic anhydride, and an organic carbonate. The negative electrode includes a negative electrode active material, and a coating resulting from reductive decomposition of a silane coupling agent is formed on a surface of the negative electrode active material.

According to a secondary battery according to the present disclosure, self-discharge can be suppressed.

BRIEF DESCRIPTION OF DRAWINGS

FIG. 1 is a schematic cross-sectional view showing an example secondary battery according to an embodiment.

DESCRIPTION OF EMBODIMENTS

In general, reductive decomposition of an aqueous electrolyte solution (which substantially is reductive decomposition of water) occurs in a range of potential, as determined with reference to Li, from about 2 V to a potential lower than 2V, and a charging/discharging reaction of a negative electrode active material such as a carbon material occurs at a potential further lower than the reductive decomposition potential of water. Accordingly, during a charging process, before the charging reaction of the negative electrode active material takes place, reductive decomposition of water occurs and the charging current is consumed by this reaction, so that the progress of the charging reaction of the negative electrode active material is hindered. In light of this, as a result of diligent studies, the present inventors discovered that a combination of a silane coupling agent and a specific additive (i.e., an alkaline earth metal salt, a dicarboxylic acid, a carboxylic anhydride, or an organic carbonate) can suppress reductive decomposition of water and also suppress self-discharge. The present inventors therefore came to devise a secondary battery having aspects described below.

A secondary battery according to a first aspect of the present disclosure includes a positive electrode, a negative electrode, and an electrolyte solution. The electrolyte solution contains water, a lithium salt, and an additive. The additive includes at least one of an alkaline earth metal salt, a dicarboxylic acid, a carboxylic anhydride, and an organic carbonate. The negative electrode includes a negative electrode active material, and a silane coupling agent is adhered to a surface of the negative electrode active material. According to the secondary battery according to the first aspect of the present disclosure, reductive decomposition of water during the charging process is suppressed, and the charging reaction of the negative electrode active material proceeds, and further, reaction between the negative electrode active material and the electrolyte solution is also suppressed. This results in suppressing self-discharge, which occurs when lithium ions occluded in the negative electrode active material are naturally released from the negative electrode active material.

A secondary battery according to a second aspect of the present disclosure includes a positive electrode, a negative electrode, and an electrolyte solution. The electrolyte solution contains water, a lithium salt, and an additive. The additive includes at least one of an alkaline earth metal salt, a dicarboxylic acid, a carboxylic anhydride, and an organic carbonate. The negative electrode includes a negative electrode active material, and a coating resulting from reductive decomposition of a silane coupling agent is formed on a surface of the negative electrode active material. The secondary battery according to the second aspect of the present disclosure is a secondary battery of an aspect assumed after the secondary battery according to the first aspect of the present disclosure is charged or is charged and discharged. That is, also in the secondary battery according to the second aspect of the present disclosure, reductive decomposition of water during the charging process is suppressed, and the charging reaction of the negative electrode active material proceeds, and further, reaction between the negative electrode active material and the electrolyte solution is also suppressed. This results in suppressing self-discharge, which occurs when lithium ions occluded in the negative electrode active material are naturally released from the negative electrode active material.

Noting that the mechanism of the advantageous effects according to the first aspect and the second aspect of the present disclosure differs depending on the type of the additive to be combined with the silane coupling agent, the mechanisms described below are supposed for the respective types of additives. When a plurality of types of additives are added, the resulting mechanism involves a combination of the advantageous effects of the respective additives. The types of additives as referred to herein denote an alkaline earth metal salt, a dicarboxylic acid, a carboxylic anhydride, and an organic carbonate, i.e., the classifications of additives.

<Alkaline Earth Metal Salt>

In cases where the silane coupling agent is combined with an alkaline earth metal salt, although differences do exist depending on the type of the silane coupling agent used, at the time of initial charging, reductive decomposition of the alkaline earth metal salt proceeds in parallel with reductive decomposition of the silane coupling agent, which results in forming a composite coating comprising a coating derived from the silane coupling agent and a coating derived from the alkaline earth metal salt. Examples of the coating component derived from the alkaline earth metal salt include fluorides including at least one of $CaF_2$, $MgF_2$, $SrF_2$, and $BaF_2$, and main examples of the coating component derived from the silane coupling agent include LiF and $SiO_x$. Since $CaF_2$, $MgF_2$, $SrF_2$, and $BaF_2$ have lower solubility in water than LiF, robustness of the coating derived from the silane coupling agent against the aqueous electrolyte solution is improved by additionally using an alkaline earth metal salt. Further, under presence of an alkaline earth metal salt which is reductively decomposed at a relatively high potential, electrochemical reduction of dissolved $CO_2$ and dissolved $O_2$ in the aqueous electrolyte solution can be significantly suppressed, and it is thereby possible to drastically suppress formation of $Li_2CO_3$ and $Li_2O$, which are coating components having relatively high solubility. As a result, the ratio of components having low solubility in water (e.g., fluoride) in the composite coating can be increased, and robustness against the aqueous electrolyte solution can be improved. Furthermore, when combined with an alkaline earth metal salt that undergoes reductive decomposition in a potential region equal to or higher than the reductive decomposition potential region of the silane coupling agent, reduction of the silane coupling agent is suppressed, so that the silane coupling agent that is unreacted or that has a low degree of reduction remains in the coating. As a result, the water-repellent effect of the remaining silane coupling agent enables to suppress permeation of water into the surface of the negative electrode active material. Due to the above-described advantageous effects, by combining the silane coupling agent with an alkaline earth metal salt, the ratio of components having low solubility in water can be increased in the coating, so that robustness of the coating against the aqueous electrolyte solution can be improved, and an electrochemically stable coating can be formed. For this reason, reaction between the negative electrode active material and the electrolyte solution is suppressed, and it becomes possible to suppress self-discharge which occurs when lithium ions occluded in the negative electrode active material are naturally released from the negative electrode active material. Here, since the composite coating comprising the coating derived from the silane coupling agent and the coating derived from the alkaline earth metal salt has lithium-ion conductivity, the negative electrode active material can occlude lithium ions through the coating during a charging process. In the silane coupling agent having a low degree of reduction within the coating, a fluoroalkane group (F1s, 688.8 eV (XPS)), a C—Si—O group (Si2p, 102.6 eV (XPS)), an O—Si—C group (Si2p, 103.5 eV (XPS)), or the like can be observed.

<Dicarboxylic Acid and Carboxylic Anhydride>

In cases where the silane coupling agent is combined with a dicarboxylic acid or a carboxylic anhydride, since dicarboxylic acid and carboxylic anhydride are reductively decomposed at a relatively high potential, electrochemical reduction of dissolved $CO_2$ and dissolved $O_2$ in the aqueous electrolyte solution can be significantly suppressed, and it is thereby possible to drastically suppress formation of $Li_2CO_3$ and $Li_2O$, which are coating components having relatively high solubility. Further, when combined with a dicarboxylic acid or carboxylic anhydride that undergoes reductive decomposition in a potential region equal to or higher than the reductive decomposition potential region of the silane coupling agent, reduction of the silane coupling agent is suppressed, so that the silane coupling agent that is unreacted or has a low degree of reduction remains in the coating. As a result, the water-repellent effect of the remaining silane coupling agent enables to suppress permeation of water into the surface of the negative electrode active material. Due to the above-described advantageous effects, by combining the silane coupling agent with a dicarboxylic acid or a carboxylic anhydride, the ratio of components having low solubility in water can be increased in the coating. Furthermore, since permeation of water into the surface of the negative electrode active material can be suppressed, robustness of the coating against the aqueous electrolyte solution can be improved, and an electrochemically stable coating can be formed. For this reason, reaction between the negative electrode active material and the electrolyte solution is suppressed, and it becomes possible to suppress self-discharge which occurs when lithium ions occluded in the negative electrode active material are naturally released from the negative electrode active material. Here, since the composite coating comprising the coating derived from the silane coupling agent and the coating derived from the dicarboxylic acid or carboxylic anhydride has lithium-ion conductivity, the negative electrode active material can occlude lithium ions through the coating during a charging process.

<Organic Carbonate>

In cases where the silane coupling agent is combined with an organic carbonate, especially when an aqueous electrolyte solution system containing an alkali salt at a high concentration is used, due to participation of the organic carbonate in the solvation structure in addition to water and the lithium salt, activity of water in the aqueous electrolyte solution can be reduced, and electrochemical stability of the water in the electrolyte solution can be improved. Further, the presence of the organic carbonate can significantly suppress electrochemical reduction of dissolved $CO_2$ and dissolved $O_2$ in the aqueous electrolyte solution, and can thereby drastically suppress formation of $Li_2CO_3$ and $Li_2O$, which are coating components having relatively high solubility. Furthermore, although differences do exist depending on the type of the silane coupling agent used, by combining with an organic carbonate that reductively decomposes at a lower potential than the silane coupling agent, defects of a coating derived from the silane coupling agent, which has a relatively large molecular weight and a poor coating denseness after reductive decomposition, can be compensated for by a coating derived from the organic carbonate, and the denseness of the coating derived from the silane coupling agent can be improved. According to the above-described effects, by combining the silane coupling agent with the organic carbonate, it is possible to achieve the advantage of improving electrochemical stability of water resulting from addition of the organic carbonate. Further, due to the effect of formation of the composite coating comprising the coating derived from the silane coupling agent and the coating derived from the organic carbonate, robustness of the coating against the aqueous electrolyte solution can be improved, and an electrochemically stable coating can be formed. For these reasons, reaction between the negative electrode active material and the electrolyte solution is suppressed, and this results in suppressing self-discharge which occurs when lithium ions occluded in the negative electrode active material are naturally released from the negative electrode active material. Here, since the composite coating comprising the coating derived from the silane coupling agent and the coating derived from the organic carbonate has lithium-ion conductivity, the negative electrode active material can occlude lithium ions through the coating during a charging process. Further, in a discharging process, lithium ions occluded in the negative electrode active material can be released.

Embodiments of the secondary battery according to the present disclosure will now be described in detail.

The shape of the secondary battery of the present embodiment is not particularly limited, and examples thereof include a coin type, a button type, a sheet type, a laminate type, a cylindrical type, a flat type, a square type, and so on. FIG. 1 is a schematic cross-sectional view showing an example secondary battery of the present embodiment. The secondary battery 20 shown in FIG. 1 comprises a cup-shaped battery housing 21, a positive electrode 22 provided in an upper part of the battery housing 21, a negative electrode 23 provided at a position facing the positive electrode 22 via a separator 24, a gasket 25 formed of an insulating material, and a sealing plate 26 which is disposed in the opening of the battery housing 21 and which seals the battery housing 21 via the gasket 25. In the secondary battery 20 shown in FIG. 1, an electrolyte solution 27 fills the space in which the positive electrode 22 and the negative electrode 23 are located. The electrolyte solution 27, the positive electrode 22, the negative electrode 23, and the separator 24 will be described below in detail.

The electrolyte solution 27 contains water and a lithium salt (hereinafter, the electrolyte solution 27 may be referred to as an aqueous electrolyte solution). Since the aqueous electrolyte solution contains water, which is non-flammable, as the main solvent, safety can be enhanced in the secondary battery using the aqueous electrolyte solution. In consideration of this point, the content of water in the electrolyte solution 27 relative to the total amount of the electrolyte solution 27 is preferably 6% by mass or higher, more preferably in a range from 8% by mass to 50% by mass, and even more preferably in a range from 8.5% by mass to 21% by mass. The electrolyte solution 27 may contain a solvent other than water. Examples of the solvent other than water include ethers, nitriles, alcohols, ketones, amines, amides, sulfur compounds, hydrocarbons, and the like. The content of the solvent other than water is preferably 50% by mass or lower, and more preferably 25% by mass or lower, relative to the total amount of the electrolyte solution 27.

As the lithium salt, any compound can be used so long as it dissolves and dissociates in a solvent containing water and causes lithium ions to be present in the aqueous electrolyte solution. The lithium salt preferably does not cause deterioration of the battery characteristics due to reaction with materials constituting the positive electrode and the negative electrode. Examples of such a lithium salt include: a salt formed from an inorganic acid such as perchloric acid, sulfuric acid, and nitric acid; a salt formed from a halide ion such as a chloride ion and a bromide ion; and a salt formed from an organic anion containing a carbon atom in the structure.

Examples of the organic anion constituting the lithium salt include anions represented by the following general formulas (i) to (vi).

$$(R^1SO_2)(R^2SO_2)N^- \quad \text{(i)}$$

($R^1$ and $R^2$ are respectively independently selected from an alkyl group or a halogen-substituted alkyl group. $R^1$ and $R^2$ may be bonded to each other to form a ring structure.)

$$R^3SO_3^- \quad \text{(ii)}$$

($R^3$ is selected from an alkyl group or a halogen-substituted alkyl group.)

$$R^4CO_2^- \quad \text{(iii)}$$

($R^4$ is selected from an alkyl group or a halogen-substituted alkyl group.)

$$(R^5SO_2)_3C^- \quad \text{(iv)}$$

($R^5$ is selected from an alkyl group or a halogen-substituted alkyl group.)

$$[(R^6SO_2)N(SO_2)N(R^7SO_2)]_2^- \quad \text{(v)}$$

($R^6$ and $R^7$ are selected from an alkyl group or a halogen-substituted alkyl group.)

$$[(R^8SO_2)N(CO)N(R^9SO_2)]_2^- \quad \text{(vi)}$$

($R^8$ and $R^9$ are selected from an alkyl group or a halogen-substituted alkyl group.)

In the above general formulas (i) to (vi), the number of carbon atoms in the alkyl group or the halogen-substituted alkyl group is preferably 1 to 6, more preferably 1 to 3, and even more preferably 1 to 2. Fluorine is preferable as the halogen of the halogen-substituted alkyl group. The number of halogen substitutions in the halogen-substituted alkyl group is less than or equal to the number of hydrogens in the original alkyl group.

Each of $R^1$ to $R^9$ is, for example, a group represented by the following general formula (vii).

$$C_nH_aF_bCl_cBr_dI_e \quad \text{(vii)}$$

(n is an integer of 1 or greater, and a, b, c, d, and e are integers of 0 or greater that satisfy 2n+1=a+b+c+d+e.)

Specific examples of the organic anion represented by the above general formula (i) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), (perfluoroethanesulfonyl)(trifluoromethanesulfonyl)imide ($[N(C_2F_5SO_2)(CF_3SO_2)]^-$), and the like. Specific examples of the organic anion represented by the above general formula (ii) include $CF_3SO_3^-$, $C_2F_5SO_3^-$, and the like. Specific examples of the organic anion represented by the above general formula (iii) include $CF_3CO_2^-$, $C_2F_5CO_2^-$, and the like. Specific examples of the organic anion represented by the above general formula (iv) include tris(trifluoromethanesulfonyl) carbon acid ($[(CF_3SO_2)_3C]^-$), tris(perfluoroethanesulfonyl) carbon acid ($[(C_2F_5SO_2)_3C]^-$), and so on. Specific examples of the organic anion represented by the above general formula (v) include sulfonylbis(trifluoromethanesulfonyl) imide ($[(CF_3SO_2)N(SO_2)N(CF_3SO_2)]_2^-$), sulfonylbis(perfluoroethanesulfonyl)imide ($[(C_2F_5SO_2)N(SO_2)N(C_2F_5SO_2)]_2^-$), sulfonyl(perfluoroethanesulfonyl)(trifluoromethanesulfonyl)imide ($[(C_2F_5SO_2)N(SO_2)N(CF_3SO_2)]_2^-$), and so on. Specific examples of the organic anion represented by the above general formula (vi) include carbonylbis(trifluoromethanesulfonyl)imide ($[(CF_3SO_2)N(CO)N(CF_3SO_2)]_2^-$), carbonylbis(perfluoroethanesulfonyl) imide ($[(C_2F_5SO_2)N(CO)N(C_2F_5SO_2)]_2^-$), carbonyl(perfluoroethanesulfonyl)(trifluoromethanesulfonyl)imide ($[(C_2F_5SO_2)N(CO)N(CF_3SO_2)]_2^-$), and so on.

Examples of organic anions other than those of the above general formulas (i) to (vi) include anions of bis(1,2-benzenediolate(2-)-O,O')borate, bis(2,3-naphthalenedioleate (2-)-O,O')borate, bis (2,2'-biphenyldiolate(2-)-O,O')borate, bis(5-fluoro-2-olate-1-benzenesulfonate-O,O')borate, and the like.

As the anion constituting the lithium salt, preferably an imide anion is included in the salt, in consideration of enabling effective suppression of battery self-discharge. Specific preferred examples of the imide anion include bis(fluorosulfonyl)imide (FSI; $[N(FSO_2)_2]^-$), (fluorosulfonyl)(trifluoromethanesulfonyl)imide (FTI; $[N(FSO_2)(CF_3SO_2)]^-$), and the like, in addition to the imide anions listed above as the examples of the organic anion represented by the above general formula (i).

In consideration of enabling effective suppression of battery self-discharge, examples of the lithium salt having a lithium ion and an imide anion include lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis (fluorosulfonyl)imide (LiFSI), lithium (fluorosulfonyl) (trifluoromethanesulfonyl)imide (LiFTI), and the like. These may be used alone or by combining two or more thereof.

Other specific examples of the lithium salt include $CF_3SO_3Li$, $C_2F_5SO_3Li$, $CF_3CO_2Li$, $C_2F_5CO_2Li$, $(CF_3SO_2)_3CLi$, $(C_2F_5SO_2)_3CLi$, $(C_2F_5SO_2)_2(CF_3SO_2)CLi$, $(C_2F_5SO_2)(CF_3SO_2)_2CLi$, $[(CF_3SO_2)N(SO_2)N(CF_3SO_2)]Li_2$, $[(C_2F_5SO_2)N(SO_2)N(C_2F_5SO_2)]Li_2$, $[(C_2F_5SO_2)N(SO_2)N(CF_3SO_2)]Li_2$, $[(CF_3SO_2)N(CO)N(CF_3SO_2)]Li_2$, $[(C_2F_5SO_2)N(CO)N(C_2F_5SO_2)]Li_2$, $[(C_2F_5SO_2)N(CO)N(CF_3SO_2)]Li_2$, lithium bis(1,2-benzenediolate(2-)-O,O')borate, lithium bis(2,3-naphthalenediolate)(2-)-O,O')borate, lithium bis(2,2'-biphenyldiolate(2-)-O,O')borate, lithium bis (5-fluoro-2-olate-1-benzenesulfonate-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), lithium hydroxide (LiOH), and the like. These may be used alone or by combining two or more thereof.

The additive includes at least one of an alkaline earth metal salt, a dicarboxylic acid, a carboxylic anhydride, and an organic carbonate.

Any alkaline earth metal salt can be used so long as it is a compound that dissolves and dissociates in a solvent containing water and causes alkaline earth metal cations to be present in the aqueous electrolyte solution. The alkaline earth metal salt preferably does not cause deterioration of the battery characteristics due to reaction with materials constituting the positive electrode and the negative electrode. Examples of the alkaline earth metal salt include salts composed of an alkaline earth metal and an anion. Examples of the alkaline earth metal include calcium, magnesium, strontium, and barium. Among the foregoing, calcium, magnesium, and strontium are preferred, and calcium is most preferred. This is because solubility in water of fluorides ($CaF_2$, $MgF_2$, $SrF_2$, $BaF_2$) constituting the main coating component that is derived from the alkaline earth metal salt and that is formed at the time of initial charging is such that $CaF_2$, $MgF_2$, and $SrF_2$ has low solubility in water, and $CaF_2$ has the lowest solubility in water. Having low solubility in water signifies that robustness of the coating against the aqueous electrolyte solution can be improved and that an electrochemically stable coating can be formed. Since an electrochemically stable coating can be formed, reaction between the negative electrode active material and the electrolyte solution can be suppressed, and it becomes possible to suppress self-discharge which occurs when lithium ions occluded in the negative electrode active material are naturally released from the negative electrode active material. As the alkaline earth metal salt, those that are reductively decomposed at a potential higher than the reductive decomposition potential of water are more preferable. One type of alkaline earth metal salt may be used alone, or two or more types thereof may be used in combination. Examples of the anion component include anions represented by the following general formulas (viii) to (xi).

$$(R^{10}SO_2)(R^{11}SO_2)N^- \quad \text{(viii)}$$

($R^{10}$ and $R^{11}$ are respectively independently selected from an alkyl group or a halogen-substituted alkyl group. $R^{10}$ and $R^{11}$ may be bonded to each other to form a ring structure.)

$$R^{12}SO_3^- \quad \text{(ix)}$$

($R^{12}$ is selected from an alkyl group or a halogen-substituted alkyl group.)

$$R^{13}CO_2^- \quad \text{(x)}$$

($R^{13}$ is selected from an alkyl group or a halogen-substituted alkyl group.)

$$(R^{14}SO_2)_3C^- \quad \text{(xi)}$$

($R^{14}$ is selected from an alkyl group or a halogen-substituted alkyl group.)

In the above general formulas (viii) to (xi), the number of carbon atoms in the alkyl group or the halogen-substituted alkyl group is preferably 1 to 6, more preferably 1 to 3, and even more preferably 1 to 2. Fluorine is preferable as the halogen of the halogen-substituted alkyl group. The number of halogen substitutions in the halogen-substituted alkyl group is less than or equal to the number of hydrogens in the original alkyl group.

Each of $R^{10}$ to $R^{14}$ is, for example, a group represented by the following general formula (xii).

$$C_nH_aF_bCl_cBr_dI_e \quad \text{(xii)}$$

(n is an integer of 1 or greater, and a, b, c, d, and e are integers of 0 or greater that satisfy 2n+1=a+b+c+d+e.)

Specific examples of the organic anion represented by the above general formula (viii) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), (perfluoroethanesulfonyl)(trifluoromethanesulfonyl)imide ($[N(C_2F_5SO_2)(CF_3SO_2)]^-$), and the like. Specific examples of the organic anion represented by the above general formula (ix) include $CF_3SO_3^-$, $C_2F_5SO_3^-$, and the like. Specific examples of the organic anion represented by the above general formula (x) include $CF_3CO_2^-$, $C_2F_5CO_2^-$, and the like. Specific examples of the organic anion represented by the above general formula (xi) include tris(trifluoromethanesulfonyl) carbon acid ($[(CF_3SO_2)_3C]^-$), tris(perfluoroethanesulfonyl) carbon acid ($[(C_2F_5SO_2)_3C]^-$), bis(perfluoroethanesulfonyl) (trifluoromethanesulfonyl)carbon acid ($[(C_2F_5SO_2)_2(CF_3SO_2)C]^-$), (perfluoroethanesulfonyl)bis (trifluoromethanesulfonyl)carbon acid ($[(C_2F_5SO_2)(CF_3SO_2)_2C]^-$), and so on.

Examples of organic anions other than those of the above general formulas (viii) to (xi) include anions of bis(1,2-benzenediolate(2-)-O,O')borate, bis(2,3-naphthalene-dioleate(2-)-O,O')borate, bis (2,2'-biphenyldiolate(2-)-O,O') borate, bis(5-fluoro-2-olate-1-benzenesulfonate-O,O') borate, and the like.

As the anion constituting the alkaline earth metal salt, preferably an imide anion is included in the salt, in consideration of enabling effective suppression of battery self-discharge. Specific preferred examples of the imide anion include bis(fluorosulfonyl)imide (FSI; $[N(FSO_2)_2]^-$), (fluorosulfonyl)(trifluoromethanesulfonyl)imide (FTI; $[N(FSO_2)(CF_3SO_2)]^-$, and the like, in addition to the imide anions listed above as the examples of the organic anion represented by the above general formula (viii).

In consideration of enabling effective suppression of battery self-discharge, examples of the alkaline earth metal salt having an alkaline earth metal and an imide anion include calcium bis(trifluoromethanesulfonyl)imide (CaTFSI), calcium bis(perfluoroethanesulfonyl)imide (CaBETI), calcium (perfluoroethanesulfonyl)(trifluoromethanesulfonyl)imide, calcium bis(fluorosulfonyl)imide (CaFSI), calcium (fluorosulfonyl)(trifluoromethanesulfonyl)imide (CaFTI), magnesium bis(trifluoromethanesulfonyl)imide (MgTFSI), magnesium bis(perfluoroethanesulfonyl)imide (MgBETI), magnesium (perfluoroethanesulfonyl) (trifluoromethanesulfonyl)imide, magnesium bis (fluorosulfonyl)imide (MgFSI), magnesium (fluorosulfonyl) (trifluoromethanesulfonyl)imide (MgFTI), strontium bis (trifluoromethanesulfonyl)imide (SrTFSI), strontium bis (perfluoroethanesulfonyl)imide (SrBETI), strontium (perfluoroethanesulfonyl)(trifluoromethanesulfonyl)imide, strontium bis(fluorosulfonyl)imide (SrFSI), strontium (fluorosulfonyl)(trifluoromethanesulfonyl)imide (SrFTI), and so on. These may be used alone or by combining two or more thereof. Among the foregoing, the calcium salts are particularly preferable. This is because $CaF_2$, which is a main coating component formed by reductive decomposition, has the lowest solubility in water, and therefore can improve electrochemical stability of the coating with respect to the aqueous electrolyte solution. As the alkaline earth metal salt, those that are reductively decomposed at a potential higher than the reductive decomposition potential of water are more preferable.

Other specific examples of the alkaline earth metal salt include $Ca[CF_3SO_3]_2$, $Ca[C_2F_5SO_3]_2$, $Ca[CF_3CO_2]_2$, $Ca[C_2F_5CO_2]_2$, $Ca[(CF_3SO_2)_3C]_2$, $Ca[(C_2F_5SO_2)_3C]_2$, $Ca[(C_2F_5SO_2)_2(CF_3SO_2)C]_2$, $Ca[(C_2F_5SO_2)(CF_3SO_2)_2C]_2$, calcium bis(1,2-benzenediolate(2-)-O,O')borate, calcium bis (2,3-naphthalenediolate)(2-)-O,O')borate, calcium bis(2,2'-biphenyldiolate(2-)-O,O')borate, calcium bis(5-fluoro-2-olate-1-benzenesulfonate-O,O')borate, calcium perchlorate ($Ca(ClO_4)_2$), calcium chloride ($CaCl_2$)), calcium bromide ($CaBr_2$), calcium hydroxide ($Ca(OH)_2$), calcium nitrate ($Ca(NO_3)_2$), calcium sulfate ($CaSO_4$), calcium sulfide (CaS), calcium hydroxide ($Ca(OH)_2$), $Mg[CF_3SO_3]_2$, $Mg[C_2F_5SO_3]_2$, $Mg[CF_3CO_2]_2$, $Mg[C_2F_5CO_2]_2$, $Mg[(CF_3SO_2)_3C]_2$, $Mg[(C_2F_5SO_2)_3C]_2$, $Mg[(C_2F_5SO_2)_2(CF_3SO_2)C]_2$, $Mg[(C_2F_5SO_2)(CF_3SO_2)_2C]_2$, magnesium bis (1,2-benzenediolate(2-)-O,O')borate, magnesium bis(2,3-naphthalenediolate)(2-)-O,O')borate, magnesium bis(2,2'-biphenyldiolate(2-)-O,O')borate, magnesium bis(5-fluoro-2-olate-1-benzenesulfonate-O,O')borate, magnesium perchlorate ($Mg(ClO_4)_2$), magnesium chloride ($MgCl_2$), magnesium bromide ($MgBr_2$), magnesium hydroxide ($Mg(OH)_2$), magnesium nitrate ($Mg(NO_3)_2$), magnesium sulfate ($MgSO_4$), magnesium sulfide (MgS), magnesium hydroxide ($Mg(OH)_2$), $Sr[CF_3SO_3]_2$, $Sr[C_2F_5SO_3]_2$, $Sr[CF_3CO_2]_2$, $Sr[C_2F_5CO_2]_2$, $Sr[(CF_3SO_2)_3C]_2$, $Sr[(C_2F_5SO_2)_3C]_2$, $Sr[(C_2F_5SO_2)_2(CF_3SO_2)C]_2$, $Sr[(C_2F_5SO_2)(CF_3SO_2)_2C]_2$, strontium bis(1,2-benzenediolate(2-)-O,O')borate, strontium bis(2,3-naphthalenediolate)(2-)-O,O')borate, strontium bis (2,2'-biphenyldiolate(2-)-O,O')borate, strontium bis(5-fluoro-2-olate-1-benzenesulfonate-O,O')borate, strontium perchlorate ($Sr(ClO_4)_2$), strontium chloride ($SrCl_2$), strontium bromide ($SrBr_2$), strontium hydroxide ($Sr(OH)_2$), strontium nitrate ($Sr(NO_3)_2$), strontium sulfate ($SrSO_4$), strontium sulfide (SrS), strontium hydroxide ($Sr(OH)_2$), and so on. These may be used alone or by combining two or more thereof. Among the foregoing, the calcium salts are particularly preferable. This is because $CaF_2$, which is a main coating component formed by reductive decomposition, has the lowest solubility in water, and can improve electrochemical stability of the coating with respect to the aqueous electrolyte solution. As the alkaline earth metal salt, those that are reductively decomposed at a potential higher than the reductive decomposition potential of water are more preferable.

Among the foregoing, in consideration of enabling effective suppression of battery self-discharge, calcium bis(trifluoromethanesulfonyl)imide, magnesium bis(trifluoromethanesulfonyl)imide, and strontium bis (trifluoromethanesulfonyl)imide are preferable. Among these, calcium bis(trifluoromethanesulfonyl)imide, which is a calcium salt, is most preferable. This is because solubility in water of fluorides, which are the coating component formed by reductive decomposition, is such that $CaF_2$, $MgF_2$, and $SrF_2$ has low solubility in water, and $CaF_2$ has the lowest solubility in water. Another reason is that reductive decomposition occurs at a potential higher than the water decomposition potential. The reason why a bis(trifluoromethanesulfonyl)imide anion is preferable is that it is suitable for preparing a high-concentration aqueous electrolyte solution and is also suitable in terms of forming fluorides at a potential higher than that of water decomposition.

The alkaline earth metal salt may be present by an amount of, for example, from 0.1% by mass or more to 5.0% by mass or less, and preferably from 0.5% by mass or more to 3.0% by mass or less, relative to the total amount of the aqueous electrolyte solution. Within the above-noted range, battery self-discharge may be effectively suppressed without impairing the lithium-ion conductivity of the aqueous electrolyte solution. When the amount added exceeds 5.0 wt %, the lithium-ion conductivity may become decreased. On the other hand, when the amount added is less than 0.1 wt %, the advantageous effects may not be sufficiently obtained.

Examples of the dicarboxylic acid include succinic acid, glutaric acid, phthalic acid, maleic acid, citraconic acid, glutaconic acid, itaconic acid, diglycolic acid, and the like. Examples of the carboxylic anhydride include succinic anhydride, glutaric anhydride, phthalic anhydride, maleic anhydride, citraconic anhydride, glutaconic anhydride, itaconic anhydride, diglycolic anhydride, and the like. Among the foregoing, in consideration of enabling effective suppression of battery self-discharge, succinic acid, succinic anhydride, maleic acid, maleic anhydride, diglycolic acid, glutaric acid, and the like are preferable. Among these, succinic acid, succinic anhydride, maleic acid, maleic anhydride, and diglycolic acid are preferable. This is because these substances are suitable in that, although differences do exist depending on the type of the silane coupling agent used, reductive decomposition can occur at a potential that is equal to or higher than the reductive decomposition potential of water and that is also equal to or higher than the reductive decomposition potential region of the silane coupling agent. Since reductive decomposition of glutaric acid proceeds competitively with reductive decomposition of water, the advantageous effects become reduced.

The dicarboxylic acid or carboxylic anhydride may be present by an amount of, for example, from 0.1% by mass or more to 5.0% by mass or less, and preferably from 0.5% by mass or more to 3.0% by mass or less, relative to the total amount of the aqueous electrolyte solution. Within the above-noted range, battery self-discharge may be effectively suppressed without impairing the lithium-ion conductivity of the aqueous electrolyte solution. When the amount added exceeds 5.0 wt %, the lithium-ion conductivity may become decreased. Furthermore, there is a risk that, in the coating, the ratio of the coating component derived from the silane coupling agent may become reduced, and coating resistance may become increased. On the other hand, when the amount added is less than 0.1 wt %, the advantageous effects may not be sufficiently obtained.

Examples of the organic carbonate include: cyclic carbonates such as ethylene carbonate, propylene carbonate, vinylidene carbonate, and butylene carbonate; chain carbonates such as dimethyl carbonate, methyl ethyl carbonate, and diethyl carbonate; and fluorinated carbonates containing fluorine as a constituent element, such as fluoroethylene carbonate, fluorodimethyl carbonate, and methyl fluoropropionate (FMP).

Among the additives, the organic carbonate is preferable in the features of suppressing battery self-discharge, improving battery charge/discharge efficiency, and the like. Among the above-listed organic carbonates, cyclic carbonates and fluorinated carbonates containing fluorine as a constituent element are particularly preferred. Further, in terms of suppressing decrease in battery self-discharge and improving battery charge/discharge efficiency, the organic carbonate is preferably reductively decomposed at a potential lower than the reductive decomposition potential of the silane coupling agent described further below. The reductive decomposition potential of the organic carbonate as determined with reference to Li is preferably 2.2 V or lower, although this depends on the type of the silane coupling agent. Examples of the organic carbonate that is reductively decomposed at 2.2 V or lower as determined with reference to Li include dimethyl carbonate, fluoroethylene carbonate, and the like. With the organic carbonate being reductively decomposed at a potential lower than that of the silane coupling agent, defects of a coating derived from the silane coupling agent can be compensated for by a coating derived from the organic carbonate, and coating denseness can be enhanced. That is, a coating resulting from reductive decomposition of the organic carbonate is deposited over a coating resulting from reductive decomposition of the silane coupling agent. As a result, assuming that, in an XPS F1s spectrum, $I_C$ denotes a peak intensity at the binding energy (686 eV) derived from LiF and $I_D$ denotes a peak intensity at the binding energy (688.8 eV) derived from unreacted C—F species (fluoroalkane group) of the silane coupling agent, the peak intensities for the surface layer, on the electrolyte solution side, of the coating satisfies $I_C>I_D$. Accordingly, reaction between the negative electrode active material and the electrolyte solution is suppressed, which results in suppressing self-discharge which occurs when lithium ions occluded in the negative electrode active material is naturally released from the negative electrode active material, and battery charge/discharge efficiency can be improved. By adding, as the organic carbonate, an organic carbonate containing fluorine as a constituent element, the ratio of component (e.g., LiF) containing fluorine and having low solubility in water can be increased, so that robustness against the aqueous electrolyte solution can be further improved, and formation of an electrochemically stable coating tends to be possible.

The organic carbonate is present preferably in a molar ratio relative to the lithium salt in the range from 1:0.01 to 1:5, and more preferably in the range from 1:0.05 to 1:1. The water is present preferably in a molar ratio relative to the lithium salt in the range from 1:0.5 to 1:4, and more preferably in the range from 1:1 to 1:2.5. Within the above-noted ranges, it may be possible to effectively suppress decrease in battery self-discharge and to further improve battery charge/discharge efficiency.

The positive electrode 22 comprises, for example, a positive electrode current collector and a positive electrode mixture layer formed on the positive electrode current collector. As the positive electrode current collector, it is possible to use a foil of a metal that is electrochemically and chemically stable in the potential range of the positive electrode, a film having the aforementioned metal disposed on a surface layer, and the like. The form of the positive electrode current collector is not particularly limited, and, for example, a porous member such as a mesh member, perforated sheet, or expanded metal made of the aforementioned metal may be used. As the material of the positive electrode current collector, it is possible to employ a known metal or the like that is usable for a secondary battery using an aqueous electrolyte solution. Examples of such a metal include stainless steel, Al, aluminum alloy, Ti, and the like. The thickness of the positive electrode current collector preferably is, for example, from 3 μm or greater to 50 μm or less, in consideration of current-collecting property, mechanical strength, and the like.

The positive electrode mixture layer contains a positive electrode active material. The positive electrode mixture layer may further contain a binder material, a conductive material, and the like.

Examples of the positive electrode active material include lithium (Li), as well as lithium transition metal oxides containing transition metal elements such as cobalt (Co), manganese (Mn), and nickel (Ni). Other positive electrode active materials include: transition metal sulfides; metal oxides; lithium-containing polyanionic compounds containing one or more transition metals, such as lithium iron phosphate ($LiFePO_4$) and lithium iron pyrophosphate ($Li_2FeP_2O_7$); sulfur-based compounds ($Li_2S$); and oxygen-containing metal salts of oxygen, lithium oxide, etc. The positive electrode active material is preferably a lithium-containing transition metal oxide, and preferably contains at least one of Co, Mn, and Ni as the transition metal element.

The lithium transition metal oxide may contain additive elements other than Co, Mn, and Ni, and may contain, for example, aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), silicon (Si), and the like.

Specific examples of the lithium transition metal oxide include, for example, $Li_xCOO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}MyO_4$, $LiMPO_4$, and $Li_2MPO_4F$ (in each of the chemical formulas, M is at least one of Na, Mg, Sc, Y, Mn, Fe, Co, Ni, Cu, Zn, Al, Cr, Pb, Sb and B; and $0<x\leq1.2$, $0<y\leq0.9$, and $2.0\leq z\leq2.3$ hold true). These lithium transition metal oxides may be used alone or by mixing a plurality thereof. In consideration of increasing the capacity, the lithium transition metal oxide preferably contains 80 mol % or more of Ni relative to the total amount of transition metals other than lithium. Further, in terms of crystal structure stability, the lithium transition metal oxide more preferably is $Li_aNi_bCo_cAl_dO_2$ (where $0<a\leq1.2$, $0.8\leq b<1$, $0<c<0.2$, $0<d\leq0.1$, and b+c+d=hold true).

As the conductive material, a known conductive material that enhances electrical conductivity of the positive electrode mixture layer can be used, and examples thereof include carbon materials such as carbon black, acetylene black, Ketjen black, graphite, carbon nanofibers, carbon nanotubes, and graphene. As the binder material, it is possible to use a known binder material that maintains a good state of contact between the positive electrode active material and the conductive material and that enhances the binding property of the positive electrode active material and the like to the surface of the positive electrode current collector. Examples thereof include fluororesins such as polytetrafluoroethylene (PTFE) and polyvinylidene fluoride (PVDF), polyacrylonitrile (PAN), polyimide, acrylic resin, polyolefin, carboxymethyl cellulose (CMC) or a salt thereof, styrene-butadiene rubber (SBR), polyethylene oxide (PEO), polyvinyl alcohol (PVA), polyvinylpyrrolidone (PVP), and the like.

The positive electrode 22 can be manufactured by, for example, applying a positive electrode mixture slurry containing the positive electrode active material, the binder material, the conductive material, and the like onto the positive electrode current collector, and drying and rolling the applied film, to thereby form the positive electrode mixture layer on the positive electrode current collector.

The negative electrode 23 comprises, for example, a negative electrode current collector and a negative electrode mixture layer formed on the negative electrode current collector. As the negative electrode current collector, it is possible to use a foil of a metal that is electrochemically and chemically stable in the potential range of the negative electrode, a film having the aforementioned metal disposed on a surface layer, and the like. The form of the negative electrode current collector is not particularly limited, and, for example, a porous member such as a mesh member, perforated sheet, or expanded metal made of the aforementioned metal may be used. As the material of the negative electrode current collector, it is possible to employ a known metal or the like that is usable for a secondary battery using an aqueous electrolyte solution. Examples of such a metal include Al, Ti, Mg, Zn, Pb, Sn, Zr, In, and the like. These may be used alone or may be used as an alloy or the like of two or more thereof, so long as the material is mainly composed of at least one of these metals. Further, in cases where two or more elements are included, those elements may not necessarily be alloyed. The thickness of the negative electrode current collector preferably is, for example, from 3 μm or greater to 50 μm or less, in consideration of current-collecting property, mechanical strength, and the like.

The negative electrode mixture layer contains a negative electrode active material. To the surface of the negative electrode active material, a silane coupling agent is adhered, which will be described further below. The negative electrode mixture layer may further contain a binder material, a conductive material, and the like. As the conductive material and the binder material, the same materials as those used on the positive electrode side can be used.

As the negative electrode active material, it is possible to employ a known negative electrode active material that is usable for a secondary battery using a conventional non-aqueous electrolyte solution. Examples of such a negative electrode active material include carbonaceous materials such as natural graphite, artificial graphite, and amorphous carbon such as soft carbon and hard carbon. Still other examples include lithium-containing alloys and metal compounds such as metal oxide, metal sulfide, and metal nitride, silicon, and the like. Examples of the lithium-containing alloys include a lithium-aluminum alloy, a lithium-tin alloy, a lithium-lead alloy, a lithium-silicon alloy, and the like. Examples of the lithium-containing metal oxide include lithium titanate ($Li_4Ti_5O_2$, etc.) and the like. Examples of the lithium-containing metal nitride include lithium cobalt nitride, lithium iron nitride, lithium manganese nitride, and the like. Furthermore, sulfur-based compounds can also be mentioned as examples. These negative electrode active materials may be used alone or by combining two or more thereof. According to the secondary battery 20 of the present embodiment, since reduction of water is suppressed, application of carbon materials, lithium-tin alloy materials, lithium-silicon alloy materials, and the like as a negative electrode active material of a battery using an aqueous electrolyte solution is possible, while such presented difficulties conventionally. Furthermore, carbon materials can be used as the main component. Here, the main component denotes a component having the highest content in the negative electrode active material.

The negative electrode 23 can be manufactured by, for example, applying a negative electrode mixture slurry containing the negative electrode active material, the binder material, and the like onto the negative electrode current collector, and drying and rolling the applied film, to thereby form the negative electrode mixture layer on the negative electrode current collector.

The silane coupling agent adhered to the surface of the negative electrode active material is reductively decomposed in the initial charging process of the secondary battery. By means of the reductive decomposition of the silane coupling agent, an electrochemically stable coating is formed on the surface of the negative electrode active material. Since the coating is an electrochemically stable coating, reductive decomposition of water hardly occurs with the coating serving as the active site. Further, since the coating is chemically stable with respect to the aqueous electrolyte solution, erosion by the aqueous electrolyte solution is suppressed, and it is possible to suppress contact of the aqueous electrolyte solution with the surface of the negative electrode active material. Here, since the coating derived from the silane coupling agent has lithium-ion conductivity, lithium ions are occluded into and released from the negative electrode active material through the coating during the charging/discharging process.

In terms of suppressing reductive decomposition of water and suppressing battery self-discharge, the silane coupling agent preferably contains fluorine as a constituent element, and is preferably reductively decomposed at a potential higher than the reductive decomposition potential of water. Considering the ease of suppressing reductive decomposition of water, the reductive decomposition potential of the silane coupling agent as determined with reference to Li (i.e., with respect to Li/Li+) is preferably 2.1 V or higher, more preferably 2.2 V or higher, and even more preferably 2.4 V or higher. This is because such values are desirable for avoiding a competitive progress of reductive decomposition of water and for providing a completely-covering dense coating before the reductive decomposition potential of water is reached. While the upper limit value is not particularly defined, it preferably is, for example, 3 V or less as determined with reference to Li. This is because a potential that does not cause oxidative dissolution of the negative electrode current collector is desirable.

In terms of suppressing reductive decomposition of water and suppressing battery self-discharge, the silane coupling agent containing fluorine as a constituent element is preferably a fluoroalkylsilane, and more preferably a fluoroalkylsilane that is reductively decomposed at a potential higher than the reductive decomposition potential of water. Specifically, a fluoroalkylsilane represented by the following formula is preferable:

[Chemical Formula 1]

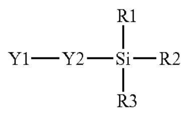

(wherein Y1 is a fluoroalkyl group having 3 to 10 carbon atoms and 7 to 21 fluorine atoms, may be linear or branched, and may include at least one of an ether bond, an ester bond, a peptide bond, a vinyl bond, a sulfonamide bond, and a hydrogen atom; Y2 is represented by $(CH_2)_n$ where n is an integer of 0 to 6, and may be linear or branched; and each of R1, R2 and R3 independently is an alkoxy group, an alkyl group, an amino group, a halogen atom, or a hydrogen atom).

As to the number of carbon atoms and the number of fluorine atoms in YT, it is preferable that the number of carbon atoms is 5 to 8 and the number of fluorine atoms is 11 to 17, in terms of carrying out reductive decomposition at a potential higher than the reductive decomposition potential of water, and facilitating suppression of reductive decomposition of water.

An example of a fluoroalkylsilane in which Y1 is a fluoroalkyl group having a peptide bond is N-(3-trimethoxysilylpropyl)perfluorohexanamide.

[Chemical Formula 2]

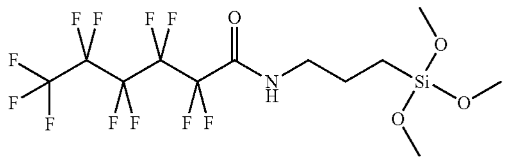

An example of a fluoroalkylsilane in which Y1 is a fluoroalkyl group having a vinyl bond is hexadecafluorododec-11-en-1-yltrimethoxysilane.

[Chemical Formula 3]

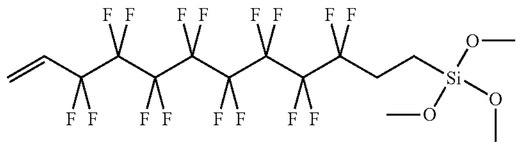

An example of a fluoroalkylsilane in which Y1 is a fluoroalkyl group having a sulfonamide bond is 3-perfluorooctylsulfonyl aminopropyltriethoxysilane.

[Chemical Formula 4]

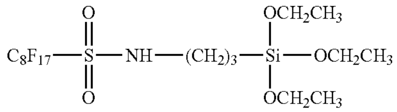

Examples of a fluoroalkylsilane in which Y1 is a fluoroalkyl group having a hydrogen atom include dedecylfluoroheptyl-propyltrimethoxysilane and dedecylfluoro-heptylpropylmethyldimethoxysilane.

[Chemical Formula 5]

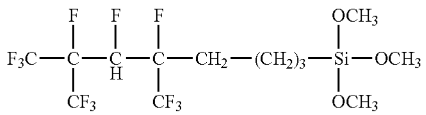

[Chemical Formula 6]

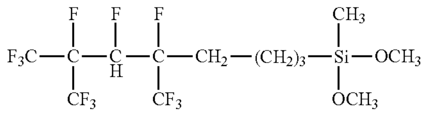

An example of a fluoroalkylsilane in which Y1 is a branched fluoroalkyl group is triethoxy[5,5,6,6,7,7,7-heptafluoro-4,4-bis(trifluoro-methyl)heptyl]silane.

[Chemical Formula 7]

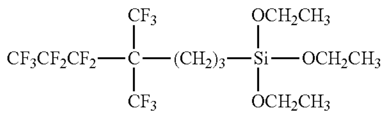

An example of a fluoroalkylsilane in which Y2 is branched is 4-methyl-(perfluorohexylethyl)propyltrimethoxysilane.

[Chemical Formula 8]

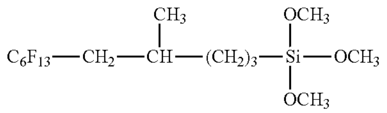

In terms of enabling effective suppression of battery self-discharge, in the fluoroalkylsilane, Y1 is more preferably represented by $C_nF_{2n+1}$ ($5 \leq n \leq 10$), and each of R1, R2, and R3 is more preferably independently represented by $OC_nH_{2n+1}$ ($1 \leq n \leq 5$) or $C_nH_{2n+1}$ ($1 \leq n \leq 5$). In Y1, a longer alkyl chain length is more preferable. This is because the fluorination ratio in the silane coupling agent can be increased, and the amount of fluorine in the coating can be increased. A fluoroalkylsilane in which R1, R2, and R3 include a methoxy group is more preferable. This is because reactivity with a hydrophilic group, such as a hydroxyl group, at the surface of the negative electrode active material can be further enhanced. Specifically, the fluoroalkylsilane preferably includes at least one of $C_5F_{11}CH_2CH_2$—$Si(OCH_3)_3$, $C_6F_{13}CH_2CH_2$—$Si(OCH_3)_3$, and $C_8F_{17}CH_2CH_2$—$Si(OCH_3)_3$.

The content of the silane coupling agent is preferably in a range from 0.01% by mass to 10% by mass relative to the mass of the negative electrode active material. By setting the content of the silane coupling agent in the above-noted range, battery self-discharge can be further suppressed. When the amount of the silane coupling agent is less than 0.01% by mass, it is difficult to completely cover the surface of the negative electrode active material with the coating derived from the silane coupling agent. Consequently, the coating derived from the silane coupling agent may not be able to block decomposition of the aqueous electrolyte solution, which may make it impossible to extend the potential window on the reduction side. Further, when the amount added exceeds 10 wt %, although such an amount is favorable in terms of covering the surface of the negative electrode active material with the coating derived from the silane coupling agent, there is a risk of hindering lithium-ion conductivity, i.e., increasing resistance, in the coating. As to the amount of the silane coupling agent, a general minimum required amount can be determined using the Stuart-Briegleb molecular model, by calculating according to the following formulas based on the BET specific surface area ($m^2/g$) of the negative electrode active material and the molecular weight (g/mol) of the silane coupling agent. In consideration of completely covering the surface of the negative electrode active material with the coating derived from the silane coupling agent, it is desirable to use the silane coupling agent in an amount more than that calculated according to the following formulas.

Amount of silane coupling agent (g)=Weight of negative electrode active material (g)×Specific surface area of negative electrode active material ($m^2/g$)÷Minimum coating area of silane coupling agent ($m^2/g$)

Minimum coating area of silane coupling agent ($m^2/g$)=$6.02\times10^{23}\times13\times10^{-20}$÷Molecular weight of silane coupling agent (g/mol)

Examples of a method for adhering the silane coupling agent to the surface of the negative electrode active material include: a method in which a solution of the silane coupling agent is directly sprayed onto the negative electrode mixture layer of the negative electrode 23 and dried; a method in which a solution of the silane coupling agent is vaporized and the vaporized silane coupling agent is brought into contact with the negative electrode mixture layer of the negative electrode 23; and so on. Before adhering the silane coupling agent to the surface of the negative electrode active material, it is preferable to perform an ozone treatment on the negative electrode mixture layer containing the negative electrode active material. Example methods of the ozone treatment include UV ozone treatment, atmospheric plasma treatment, and the like. Among the foregoing, UV ozone treatment is preferable. UV ozone treatment can be performed using, for example, a UV cleaning/surface-modifying device (ASM1101N) (Asumi Giken Co., Ltd.). It is noted that the silane coupling agent may be adhered to a powder of the negative electrode active material at a point before the manufacture of the negative electrode 23, or the silane coupling agent may be added to the negative electrode mixture slurry and thereby be adhered to the surface of the negative electrode active material.

After charging the secondary battery 20 of the present embodiment, the coating derived from the silane coupling agent and formed on the surface of the negative electrode active material contains, for example, components such as LiF, $SiO_x$ ($0<x<2$), $Li_2CO_3$, and $Li_2O$. It is considered that, by having LiF or $SiO_x$ ($0<x<2$) included in the coating, the coating becomes electrochemically stable and is also configured to exhibit lithium-ion conductivity. It is noted that, by using the above-described fluoroalkylsilane as the silane coupling agent, the ratio of LiF and $SiO_x$ ($0<x<2$) in the coating tends to become increased.

The above-noted $SiO_x$ is preferably such that valency of Si decreases in the coating from the surface side toward the deepest side. Further, it is preferable that the above-noted LiF is unevenly locally distributed toward the deepest side of the coating. Here, the deepest side of the coating denotes a side toward the area in contact with the surface of the negative electrode active material. That is, assuming that, in an XPS F1s spectrum, $I_A$ denotes a peak intensity at the binding energy (686 eV) derived from LiF and that $I_B$ denotes a peak intensity at the binding energy (688.8 eV) derived from unreacted silane coupling agent (fluoroalkane group), the peak intensities change in the coating from the deepest side to the surface layer on the electrolyte solution side, from satisfying $I_A>I_B$ to satisfying $I_A<I_B$. These characteristics are achieved by, for example, using the above-described fluoroalkylsilane as the silane coupling agent. Further, a coating having these characteristics indicate that fluoroalkylsilane that is unreacted or that has a low degree of reduction remains in the surface layer on the electrolyte solution side, and due to the effect of the remaining fluoroalkylsilane that is unreacted or that has a low degree of reduction, water repellency is imparted to the coating surface layer on the electrolyte solution side. As a result, permeation of water into the coating and to the surface of the negative electrode active material can be suppressed, and the coating becomes electrochemically stable. By adding an additive that is reductively decomposed to form a coating at a potential higher than the reductive decomposition potential region of the silane coupling agent, the residual amount of fluoroalkylsilane that is unreacted or that has a low degree of reduction can be significantly increased. Examples of such an additive include alkaline earth metal salts, dicarboxylic acids, carboxylic anhydrides, and the like. By simply adding an alkaline earth metal salt, dicarboxylic acid, or carboxylic anhydride to the electrolyte solution, $CaF_2$ derived from CaTFSI and LiF derived from LiTFSI anions would hardly be formed before reaching the water decomposition potential, and the majority of the coating component would become $Li_2CO_3$ and $Li_2O$ having relatively high solubility in water.

After charging the secondary battery 20 of the present embodiment, in cases where the additive contains an alkaline earth metal salt, the coating derived from the silane coupling agent and formed on the surface of the negative electrode active material corresponds to the alkaline earth metal species and further contains a fluoride ($CaF_2$, $MgF_2$, $SrF_2$, $BaF_2$). The fluoride ($CaF_2$, $MgF_2$, $SrF_2$, $BaF_2$), which is a coating component derived from the alkaline earth metal salt, has lower solubility in water than LiF, which is a fluoride derived from the silane coupling agent. For this reason, by additionally using the alkaline earth metal salt, robustness of the coating derived from the silane coupling agent against the aqueous electrolyte solution can be improved. Further, the presence of an alkaline earth metal salt which is reductively decomposed at a relatively high potential can suppress electrochemical reduction of dissolved $CO_2$ and dissolved $O_2$ in the aqueous electrolyte solution, and it therefore becomes possible to suppress formation of $Li_2CO_3$ and $Li_2O$, which are coating components having relatively high solubility. Furthermore, when using an alkaline earth metal salt that undergoes reductive decomposition at a potential equal to or higher than the reductive decomposition potential region of the silane coupling agent, the progress of reduction of the silane coupling agent is suppressed, so that sites of the silane coupling agent that are unreacted or that have a low degree of reduction (such as a fluoroalkane group (F1s, 688.8 eV (XPS)), a C—Si—O group (Si2p, 102.6 eV (XPS)), and an O—Si—C group (Si2p, 103.5 eV (XPS)) can intentionally be caused to remain in the coating in large quantities. Due to the residual presence of such sites of the silane coupling agent that are unreacted or that have a low degree of reduction in the coating, permeation of water to the surface of the negative electrode active material can be suppressed. Due to the above-described advantageous effects, robustness against the aqueous electrolyte solution can be improved, and the coating becomes electrochemically stable. Here, by simply adding the alkaline earth metal salt to the electrolyte solution, contact of water with the surface of the negative electrode active material cannot be avoided during formation of the coating, and electrochemical reduction of dissolved $CO_2$ and dissolved $O_2$ cannot be suppressed, so that the resulting coating would have high ratios of $Li_2CO_3$ and $Li_2O$ components which have relatively high solubility in water. It therefore would not be possible to form an electrochemically stable coating having sufficient robustness against the aqueous electrolyte solution before reductive decomposition of water is started. In order to reduce the $Li_2CO_3$ and $Li_2O$ component ratios, it is necessary to use, in combination, a silane coupling agent that can form a uniform coating on the entire surface of the negative electrode active material at the time of initial charging while in a state in which the silane coupling agent is adhered to the surface of the negative electrode active material in advance so that contact of water with the surface of the negative electrode active material is avoided. Further, for avoiding contact of water with the surface of the negative electrode active material, it is also necessary to select, for the combined use, an alkaline earth metal salt that is reductively decomposed at a potential equal to or higher than the reductive decomposition potential region of the silane coupling agent.

After charging the secondary battery 20 of the present embodiment, in cases where the additive contains a dicarboxylic acid or carboxylic anhydride, the coating derived from the silane coupling agent and formed on the surface of the negative electrode active material can suppress electrochemical reduction of dissolved $CO_2$ and dissolved $O_2$ in the aqueous electrolyte solution, and it therefore becomes possible to drastically suppress formation of $Li_2CO_3$ and $Li_2O$, which are coating components having relatively high solubility. Further, when under presence of a dicarboxylic acid or carboxylic anhydride that undergoes reductive decomposition at a potential equal to or higher than the reductive decomposition potential region of the silane coupling agent, the progress of reduction of the silane coupling agent is suppressed, so that sites of the silane coupling agent that are unreacted or that have a low degree of reduction (such as a fluoroalkane group (F1s, 688.8 eV (XPS)), a C—Si—O group (Si2p, 102.6 eV (XPS)), and an O—Si—C group (Si2p, 103.5 eV (XPS)) can intentionally be caused to remain in the coating in large quantities. Due to the residual presence of such sites of the silane coupling agent that are unreacted or that have a low degree of reduction in the coating, permeation of water to the surface of the negative electrode active material can be suppressed. Due to the above-described advantageous effects, robustness against the aqueous electrolyte solution can be improved, and the coating becomes electrochemically stable. Here, by simply adding the dicarboxylic acid or carboxylic anhydride to the electrolyte solution, LiF derived from LiTFSI anions would hardly be formed before reaching the water decomposition potential, and the majority of the coating component would become $Li_2CO_3$ and $Li_2O$ having relatively high solubility in water, so that it would not be possible to form an electrochemically stable coating having sufficient robustness against the aqueous electrolyte solution before reductive decomposition of water is started. It is necessary to adhere a silane coupling agent to the surface of the negative electrode active material in advance so that access of water to the surface of the negative electrode active material is avoided, and while in that state, to cause a uniform coating to be formed on the entire surface of the negative electrode active material at the time of initial charging. Further, it is important to select a dicarboxylic acid or carboxylic anhydride that is reductively decomposed at a potential equal to or higher than the reductive decomposition potential region of the silane coupling agent.

The separator 24 is not particularly limited so long as it allows lithium ions to pass through and has a function to electrically isolate the positive electrode and the negative electrode from each other, and, for example, a porous sheet made of a resin, an inorganic material, or the like is used. Specific examples of the porous sheet include a microporous thin film, a woven fabric, a non-woven fabric, and so on. Example materials of the separator include olefin resins such as polyethylene and polypropylene, polyamide, polyamide-imide, and cellulose. Examples of the inorganic material that constitutes the separator include glass and ceramics such as borosilicate glass, silica, alumina, and titania. The separator may be a laminate having a cellulose fiber layer and a fiber layer of thermoplastic resin such as olefin resin. Further, the separator may be a multilayer separator including a polyethylene layer and a polypropylene layer, and a separator having a surface coated with a material such as aramid resin or ceramic may also be used.

EXAMPLES

While the present disclosure will be further described by reference to Examples, the present disclosure is not limited to these Examples.

Example 1

[Negative Electrode]

Hard carbon serving as a negative electrode active material and PVDF serving as a binder material were mixed in N-methyl-2-pyrrolidone (NMP) in a solid content mass ratio of 96:4, so as to prepare a negative electrode mixture slurry. Next, the negative electrode mixture slurry was applied onto a negative electrode current collector made of copper foil.

The applied film was dried and then rolled with a roller, and an electrode was thereby prepared.

A glass bottle containing a fluoroalkylsilane solution (composition: $CF_3(CF_2)_7CH_2CH_2$—Si—$(OCH_3)_3$), which is a silane coupling agent, and the electrode were placed in a metal container with a lid. This metal container was placed in a thermostatic chamber, and heated in a dry room environment (dew point: −40° C. or lower) at 120° C. for 12 hours. By this processing, the fluoroalkylsilane was volatilized and adhered to the surface of the negative electrode active material constituting the electrode. The electrode after the above processing was cut into a predetermined size, and a negative electrode was thereby obtained. The amount of applied film and the packing density of the negative electrode were 32.3 g/$m^2$ and 1.0 g $cm^3$, respectively.

[Positive Electrode]

$LiCoO_2$ serving as a positive electrode active material, carbon black serving as a conductive material, and PVdF serving as a binder material were mixed in NMP in a mass ratio of 94:3:3, so as to prepare a positive electrode mixture slurry. Next, the positive electrode mixture slurry was applied onto a positive electrode current collector made of Ti foil, and the applied film was dried and then rolled with a roller. Subsequently, the product was cut into a predetermined electrode size, and a positive electrode was thereby obtained. The amount of applied film and the packing density of the positive electrode were 65.0 g/$cm^2$ and 2.8 g $cm^{-3}$, respectively.

[Electrolyte Solution]

An electrolyte solution was prepared by adding calcium bis(trifluoromethanesulfonyl)imide (CaTFSI) by an amount of 1% by mass to a solution obtained by mixing lithium salts (LITFSI:LIBETI=0.7:0.3 (molar ratio)) and water so as to attain a molar ratio of 1:2.

[Three-Electrode Cell]

A three-electrode cell containing the above electrolyte solution was constructed by using the above negative electrode as the working electrode, the above positive electrode as the counter electrode, and Ag/AgCl (3M NaCl) as the reference electrode.

Example 2

A three-electrode cell was constructed in the same manner as in Example 1 except that, in preparing the electrolyte solution, 1% by mass of maleic acid was added instead of calcium bis(trifluoromethanesulfonyl)imide.

Example 3

A three-electrode cell was constructed in the same manner as in Example 1 except that, in preparing the electrolyte solution, 1% by mass of diglycolic acid was added instead of calcium bis(trifluoromethanesulfonyl)imide.

Example 4

A three-electrode cell was constructed in the same manner as in Example 1 except that, in preparing the electrolyte solution, 1% by mass of glutaric acid was added instead of calcium bis(trifluoromethanesulfonyl)imide.

Example 5

A three-electrode cell was constructed in the same manner as in Example 1 except that, in preparing the electrolyte solution, 1% by mass of succinic anhydride was added instead of calcium bis(trifluoromethanesulfonyl)imide.

Example 6

A three-electrode cell was constructed in the same manner as in Example 1 except that, in preparing the electrolyte solution, 0.5% by mass of succinic acid and 0.5% by mass of maleic anhydride were added instead of calcium bis (trifluoromethanesulfonyl)imide.

Comparative Example 1

A three-electrode cell was constructed in the same manner as in Example 1 except that, in preparing the negative electrode (i.e., working electrode), the processing of adhering fluoroalkylsilane to the surface of the negative electrode active material was not performed, and in preparing the electrolyte solution, calcium bis(trifluoromethanesulfonyl) imide was not added.

Comparative Examples 2 to 7

Comparative Examples 2 to 7 were identical to Examples 1 to 6 except that, in preparing the negative electrode (i.e., working electrode), the processing of adhering fluoroalkylsilane to the surface of the negative electrode active material was not performed.

Comparative Example 8

A three-electrode cell was constructed in the same manner as in Example 1 except that, in preparing the electrolyte solution, calcium bis(trifluoromethanesulfonyl)imide was not added.

For the three-electrode cells of Examples 1 to 6 and Comparative Examples 1 to 8, linear sweep voltammetry was performed, and OCP of the negative electrode was measured. The measurement conditions were as shown below.

Initial potential: OCV

Potential scanning range: −3.238 V~OCV with respect to Ag/AgCl (3M NaCl)

OCP measurement time: 30 minutes from after potential sweep to −3.238 V with respect to Ag/AgCl (3M NaCl)

Sweep rate: 0.1 mV/sec

Measurement temperature: 25° C.

Table 1 shows, for each of Examples 1 to 6 and Comparative Examples 1 to 8, the results of the OCP of the negative electrode after 0 minute (i.e., OCP after the potential sweep to −3.238 V), OCP of the negative electrode after 1 minute (i.e., OCP measured 1 minute after the potential sweep to −3.238 V), OCP of the negative electrode after 10 minutes (i.e., OCP measured 10 minutes after the potential sweep to −3.238 V), and OCP of the negative electrode after 20 minutes (i.e., OCP measured 20 minutes after the potential sweep to −3.238 V). All of the negative electrode OCP values shown in Table 1 are values converted using lithium as the reference (i.e., values with respect to Li/Li+).

TABLE 1

| | Silane Coupling Agent | Electrolyte Solution: Base Electrolyte Solution | Electrolyte Solution: Additive (Amount Added) | |
|---|---|---|---|---|
| Example 1 | $CF_3(CF_2)_7CH_2CH_2$—Si—$(OCH_3)_3$ | $LITFSI_{0.7}LIBETI_{0.3}$•$2H_2O$ | CaTFSI (1 wt %) | |
| Example 2 | | | Maleic Acid (1 wt %) | |
| Example 3 | | | Diglycolic Acid (1 wt %) | |
| Example 4 | | | Glutaric Acid (1 wt %) | |
| Example 5 | | | Succinic Anhydride (1 wt %) | |
| Example 6 | | | Succinic Acid (0.5 wt %) | Maleic Anhydride (0.5 wt %) |
| Comparative Example 1 | — | | — | |
| Comparative Example 2 | — | | CaTFSI (1 wt %) | |
| Comparative Example 3 | — | | Maleic Acid (1 wt %) | |
| Comparative Example 4 | — | | Diglycolic Acid (1 wt %) | |
| Comparative Example 5 | — | | Glutaric Acid (1 wt%) | |
| Comparative Example 6 | — | | Succinic Anhydride (1 wt %) | |
| Comparative Example 7 | — | | Succinic Acid (0.5 wt %) | Maleic Anhydride (0.5 wt %) |
| Comparative Example 8 | $CF_3(CF_2)_7CH_2CH_2$—Si—$(OCH_3)_3$ | | — | |

| | Negative Electrode OCP (V): After 0 Min | After 1 Min | After 10 Min | After 20 Min |
|---|---|---|---|---|
| Example 1 | 0.96 | 1.25 | 1.61 | 2.14 |
| Example 2 | 1.07 | 1.23 | 1.50 | 1.83 |
| Example 3 | 0.90 | 1.25 | 1.49 | 1.78 |
| Example 4 | 0.95 | 1.41 | 1.72 | 2.16 |
| Example 5 | 0.73 | 1.07 | 1.14 | 1.18 |
| Example 6 | 0.90 | 1.12 | 1.33 | 1.49 |
| Comparative Example 1 | 1.61 | 2.14 | 2.86 | 2.98 |
| Comparative Example 2 | 1.44 | 1.63 | 2.38 | 2.78 |
| Comparative Example 3 | 1.25 | 1.30 | 1.93 | 2.47 |
| Comparative Example 4 | 1.50 | 1.80 | 2.71 | 2.92 |
| Comparative Example 5 | 1.69 | 2.22 | 2.88 | 2.99 |
| Comparative Example 6 | 1.66 | 2.36 | 2.92 | 3.00 |
| Comparative Example 7 | 1.07 | 1.17 | 1.59 | 1.93 |
| Comparative Example 8 | 0.96 | 1.25 | 1.79 | 2.59 |

Referring to Table 1, in comparing Example 1 with Comparative Example 2, Example 2 with Comparative Example 3, Example 3 with Comparative Example 4, Example 4 with Comparative Example 5, Example 5 with Comparative Example 6, and Example 6 with Comparative Example 7, each of which pairs uses an aqueous electrolyte solution having the same composition, all of the negative electrode OCP values from after 0 minute to after 20 minutes were lower in the Examples.

The Examples indicate that, by adding an alkaline earth metal salt, dicarboxylic acid, or carboxylic anhydride to the aqueous electrolyte solution in addition to adhering fluoroalkylsilane to the surface of the negative electrode active material, the property of occluding lithium ions into the negative electrode active material is enhanced, and the occluded lithium ions are easily accumulated in the negative electrode active material. On the other hand, in Comparative Examples 1 to 7, the change in OCP of the negative electrode from after 0 minute to after 20 minutes was rapid. This indicates that occlusion of lithium ions hardly occurred, or even if occurred, the occluded lithium ions were not accumulated in the negative electrode active material but rather released instantaneously. Accordingly, it can be said that, in Examples 1 to 6 having a silane coupling agent adhered to the surface of the negative electrode active material and also having an alkaline earth metal salt, dicarboxylic acid, or carboxylic anhydride added to the aqueous electrolyte solution, self-discharge is suppressed as compared to in Comparative Examples 1 to 7 in which no silane coupling agent was adhered to the surface of the negative electrode active material. Further, as compared to Comparative Example 8 having a silane coupling agent attached to the surface of the negative electrode active material but having no alkaline earth metal salt, dicarboxylic acid, or carboxylic anhydride added to the aqueous electrolyte solution, the negative electrode OCP values after 10 minutes and after 20 minutes were lower in Examples 1 to 6. This indicates that, even after 20 minutes have passed, more lithium ions were accumulated in the negative electrode active material in Examples 1 to 6. Accordingly, it can be said that, in Examples 1 to 6 in which an alkaline earth metal salt, dicarboxylic acid, or carboxylic anhydride was added to the aqueous electrolyte solution, self-discharge was more suppressed as compared to in Comparative Example 8 in which no such compound was added to the aqueous electrolyte solution. This is due to the following reasons. In Examples 1 to 6 in which addition of CaTFSI, maleic acid, diglycolic acid, glutaric acid, or succinic anhydride, or succinic acid and maleic anhydride was carried out in addition to adhesion of fluoroalkylsilane, the presence of an additive that undergoes reductive decomposition at a relatively high potential suppresses electrochemical reduction of dissolved $O_2$ and dissolved $CO_2$, and the ratio of $Li_2CO_3$ and $Li_2O$ components can be drastically reduced, so that robustness of the coating against the aqueous electrolyte solution can be enhanced, and an electrochemically stable coating can be formed. In contrast, in Comparative Examples 2 to 7 in which only addition of CaTFSI, maleic acid, diglycolic acid, glutaric acid, or succinic anhydride, or succinic acid and maleic anhydride was carried out, $CaF_2$ derived from CaTFSI and LiF derived from LiTFSI anions are hardly formed before reductive decomposition of water, so that the majority of the coating component becomes $Li_2CO_3$ and $Li_2O$ having relatively high solubility in water. Further, in Comparative Example 8 in which only adhesion of fluoroalkylsilane was carried out, before reductive decomposition of water, a coating derived from the fluoroalkylsilane can cover the surface of the negative electrode active material with more LiF as compared to cases in which only addition of CaTFSI, maleic acid, diglycolic acid, glutaric acid, or succinic anhydride, or succinic acid and maleic anhydride was carried out. However, at the same time that the fluoroalkylsilane is reductively decomposed, water repellency of the surface of the negative electrode active material becomes decreased, so that electrochemical reduction of dissolved $O_2$ and dissolved $CO_2$ proceeds, and the resulting coating has high ratios of $Li_2CO_3$ and $Li_2O$ components which have relatively high solubility. For the above-described reasons, in Comparative Examples 2 to 7 in which only addition of CaTFSI, maleic acid, diglycolic acid, glutaric acid, or succinic anhydride, or succinic acid and maleic anhydride was carried out, and in Comparative Example 8 in which only adhesion of fluoroalkylsilane was carried out, the coating has low robustness against the aqueous electrolyte solution, and the coating becomes electrochemically unstable. This makes it difficult to significantly suppress self-discharge.

Example 7

A three-electrode cell was constructed in the same manner as in Example 1 except that the following electrolyte solution was used. An electrolyte solution was prepared by adding 3.34% by mass of dimethyl carbonate (DMC) and 3.34% by mass of fluoroethylene carbonate (FEC) to a solution obtained by mixing a lithium salt (LITFSI) and water so as to attain a molar ratio of 1:1.8. Here, the ratio of the organic carbonates (i.e., DMC and FEC) to water was 0.22:1.8 by molar ratio.

Example 8

A three-electrode cell was constructed in the same manner as in Example 1 except that the following electrolyte solution was used. An electrolyte solution was prepared by adding 1.65% by mass of dimethyl carbonate (DMC) and 1.65% by mass of fluoroethylene carbonate (FEC) to a solution obtained by mixing a lithium salt (LITFSI) and water so as to attain a molar ratio of 1:2. Here, the ratio of the organic carbonates (i.e., DMC and FEC) to water was 0.11:2.0 by molar ratio.

Example 9

A three-electrode cell was constructed in the same manner as in Example 1 except that the following electrolyte solution was used. An electrolyte solution was prepared by adding 1.0% by mass of dimethyl carbonate (DMC) and 1.0% by mass of fluoroethylene carbonate (FEC) to a solution obtained by mixing lithium salts (LITFSI:LIBETI=0.7:0.3) and water so as to attain a molar ratio of 1:2. Here, the ratio of the organic carbonates (i.e., DMC and FEC) to water was 0.07:2.0 by molar ratio.

Example 10

A three-electrode cell was constructed in the same manner as in Example 1 except that the following electrolyte solution was used. An electrolyte solution was prepared by adding 1.65% by mass of dimethyl carbonate (DMC) and 1.65% by mass of fluoroethylene carbonate (FEC) to a solution obtained by mixing lithium salts (LITFSI:LIBETI=0.7:0.3) and water so as to attain a molar ratio of 1:2. Here, the ratio of the organic carbonates (i.e., DMC and FEC) to water was 0.11:2.0 by molar ratio.

Example 11

A three-electrode cell was constructed in the same manner as in Example 1 except that the following electrolyte solution was used. An electrolyte solution was prepared by adding 1.0% by mass of fluoroethylene carbonate (FEC) to a solution obtained by mixing lithium salts (LITFSI:LIBETI=0.7:0.3) and water so as to attain a molar ratio of 1:2. Here, the ratio of the organic carbonate (i.e., FEC) to water was 0.03:2.0 by molar ratio.

Example 12

A three-electrode cell was constructed in the same manner as in Example 1 except that the following electrolyte solution was used. An electrolyte solution was prepared by adding 2.0% by mass of fluoroethylene carbonate (FEC) to a solution obtained by mixing lithium salts (LITFSI:LIBETI=0.7:0.3) and water so as to attain a molar ratio of 1:2. Here, the ratio of the organic carbonate (i.e., FEC) to water was 0.07:2.0 by molar ratio.

Example 13

A three-electrode cell was constructed in the same manner as in Example 1 except that the following electrolyte solution was used. An electrolyte solution was prepared by adding 2.0% by mass of vinylidene carbonate (VC) to a solution obtained by mixing lithium salts (LITFSI:LIBETI=0.7:0.3) and water so as to attain a molar ratio of 1:2. Here, the ratio of the organic carbonate (i.e., VC) to water was 0.08:2 by molar ratio.

Comparative Examples 9 to 15

Comparative Examples 8 to 13 were identical to Examples 7 to 13 except that, in preparing the negative electrode (i.e., working electrode), the processing of adhering fluoroalkylsilane to the surface of the negative electrode active material was not performed.

For the three-electrode cells of Examples 7 to 13 and Comparative Examples 9 to 15, cyclic voltammetry was performed, and the charge/discharge efficiency in the first cycle was evaluated. The measurement conditions were as shown below.

Initial potential: OCV

First turnaround potential: −2.950 V with respect to Ag/AgCl (3M NaCl) (0.288 V as determined with reference to Li)

Second turnaround potential: −0.238V with respect to Ag/AgCl (3M NaCl) (3 V as determined with reference to Li)

Number of cycles: 2 cycles

Sweep rate: 0.5 mV/sec

Measurement temperature: 25° C.

Charge/discharge efficiency: (Quantity of electricity during oxidation (C)/Quantity of electricity during reduction (C))×100

(The quantity of electricity during reduction includes a quantity of electricity during reduction derived from the silane coupling agent and the additive.)

Further, in a separate process, linear sweep voltammetry was performed for the three-electrode cells of Examples 7 to 13 and Comparative Examples 9 to 12, and OCP of the negative electrode was measured. The measurement conditions were as shown below.

Initial potential: OCV

Potential scanning range: −3.238 V~ OCV with respect to Ag/AgCl (3M NaCl)

OCP measurement time: 30 minutes from after potential sweep to −3.238 V with respect to Ag/AgCl (3M NaCl)

Sweep rate: 0.1 mV/sec

Measurement temperature: 25° C.

Table 2 shows, for each of Examples 7 to 10 and Comparative Examples 9 to 12, the results of the OCP of the negative electrode after 0 minute (i.e., OCP after the potential sweep to −3.238 V), OCP of the negative electrode after 1 minute (i.e., OCP measured 1 minute after the potential sweep to −3.238 V), OCP of the negative electrode after 10 minutes (i.e., OCP measured 10 minutes after the potential sweep to −3.238 V), OCP of the negative electrode after 20 minutes (i.e., OCP measured 20 minutes after the potential sweep to −3.238 V), and OCP of the negative electrode after 30 minutes (i.e., OCP measured 30 minutes after the potential sweep to −3.238 V). All of the negative electrode OCP values shown in Table 2 are values converted using lithium as the reference (i.e., values with respect to Li/Li+).

TABLE 2

| | Silane Coupling Agent | Electrolyte Solution: Base Electrolyte Solution | Electrolyte Solution: Additive (Amount Added) | |
|---|---|---|---|---|
| Example 7 | $CF_3(CF_2)_7CH_2CH_2$—Si—$(OCH_3)_3$ | LITFSI•1.8$H_2O$ | DMC (3.34 wt %) | FEC (3.34 wt %) |
| Example 8 | | LITFSI•2$H_2O$ | DMC (1.65 wt %) | FEC (1.65 wt %) |
| Example 9 | | $LITFSI_{0.7}LIBETI_{0.3}$•2$H_2O$ | DMC (1.0 wt %) | FEC (1.0 wt %) |
| Example 10 | | | DMC (1.65 wt %) | FEC (1.65 wt %) |
| Comparative Example 9 | — | LITFSI•1.8$H_2O$ | DMC (3.34 wt %) | FEC (3.34 wt %) |
| Comparative Example 10 | — | LITFSI•2$H_2O$ | DMC (1.65 wt %) | FEC (1.65 wt %) |
| Comparative Example 11 | — | $LITFSI_{0.7}LIBETI_{0.3}$ | DMC (1.0 wt %) | FEC (1.0 wt %) |
| Comparative Example 12 | — | $LITFSI_{0.7}LIBETI_{0.3}$•2$H_2O$ | DMC (1.65 wt %) | FEC (1.65 wt %) |

| | Negative Electrode OCP (V) After 0 Min | After 1 Min | After 10 Min | After 20 Min | After 30 Min |
|---|---|---|---|---|---|
| Example 7 | 0.44 | 1.03 | 1.16 | 1.24 | 1.30 |
| Example 8 | 0.89 | 1.13 | 1.31 | 1.53 | 1.74 |
| Example 9 | 0.93 | 1.12 | 1.34 | 1.55 | 1.82 |
| Example 10 | 0.87 | 1.09 | 1.22 | 1.32 | 1.43 |
| Comparative Example 9 | 1.00 | 1.08 | 1.19 | 1.29 | 1.40 |
| Comparative Example 10 | 1.33 | 1.48 | 2.29 | 2.73 | 2.87 |
| Comparative Example 11 | 1.21 | 1.34 | 1.51 | 1.79 | 2.09 |
| Comparative Example 12 | 1.07 | 1.23 | 1.50 | 1.83 | 2.16 |

Further, Table 3 shows the results of the charge/discharge efficiency in the first cycle in Examples 7 to 13 and Comparative Examples 9 to 15.

TABLE 3

| | Silane Coupling Agent | Electrolyte Solution: Base Electrolyte Solution | Electrolyte Solution: Additive (Amount Added) | Charge/Discharge Efficiency in the First Cycle (%) |
|---|---|---|---|---|
| Example 7 | $CF_3(CF_2)_7CH_2CH_2$—Si—$(OCH_3)_3$ | LITFSI•$1.8H_2O$ | DMC (3.34 wt %) FEC (3.34 wt %) | 6.07 |
| Example 8 | | LITFSI•$2H_2O$ | DMC (1.65 wt %) FEC (1.65 wt %) | 1.95 |
| Example 9 | | $LITFSI_{0.7}LIBETI_{0.3}$•$2H_2O$ | DMC (1.0 wt %) FEC (1.0 wt %) | 2.70 |
| Example 10 | | | DMC (1.65 wt %) FEC (1.65 wt %) | 3.85 |
| Example 11 | | | FEC (1.0 wt %) | 1.36 |
| Example 12 | | | FEC (2.0 wt %) | 4.37 |
| Example 13 | | | VC (2.0 wt %) | 1.73 |
| Comparative Example 9 | — | LITFSI•$1.8H_2O$ | DMC (3.34 wt %) FEC (3.34 wt %) | 0 |
| Comparative Example 10 | — | LITFSI•$2H_2O$ | DMC (1.65 wt %) FEC (1.65 wt %) | 0 |
| Comparative Example 1 | — | $LITFSI_{0.7}LIBETI_{0.3}$•$2H_2O$ | — | 0 |
| Comparative Example 11 | — | | DMC (1.0 wt %) FEC (1.0 wt %) | 0 |
| Comparative Example 12 | — | | DMC (1.65 wt %) FEC (1.65 wt %) | 0 |
| Comparative Example 13 | — | | FEC (1.0 wt %) | 0 |
| Comparative Example 14 | — | | FEC (2.0 wt %) | 0 |
| Comparative Example 15 | — | | VC (2.0 wt %) | 0 |

Referring to Table 2, in comparing Example 7 with Comparative Example 9, Example 8 with Comparative Example 10, Example 9 with Comparative Example 11, and Example 10 with Comparative Example 12, each of which pairs uses an aqueous electrolyte solution having the same composition, all of the negative electrode OCP values from after 0 minute to after 30 minutes were lower in the Examples. Accordingly, it can be said that, as compared to cases in which organic carbonates are simply added to the aqueous electrolyte solution, self-discharge of a secondary battery is better suppressed by combinedly carrying out adhesion of the silane coupling agent to the surface of the negative electrode active material and addition of the organic carbonates to the aqueous electrolyte solution.

Further, as can be seen in Table 3, in Examples 7 to 13 in which adhesion of the silane coupling agent to the surface of the negative electrode active material and addition of the organic carbonates to the aqueous electrolyte solution were combinedly carried out, even though a carbon-based material was used as the negative electrode active material, occlusion and release of lithium occurred, and charge/discharge efficiency values were calculated. On the other hand, in Comparative Examples 9 to 15 in which the organic carbonates were simply added to the aqueous electrolyte solution, with the use of a carbon-based material as the negative electrode active material, lithium occlusion occurred, but lithium release did not occur, so that the charge/discharge efficiency was 0.

REFERENCE SIGNS LIST

20 secondary battery
21 battery housing
22 positive electrode
23 negative electrode
24 separator
25 gasket
26 sealing plate
27 electrolyte solution

The invention claimed is:

1. A secondary battery comprising a positive electrode, a negative electrode, and an electrolyte solution, wherein
the electrolyte solution contains water, a lithium salt, and an additive,
the negative electrode includes a negative electrode active material, and a silane coupling agent is adhered to a surface of the negative electrode active material,
the negative electrode active material contains carbon material as a main component,
the additive includes an organic carbonate,
a content of the water in the electrolyte solution relative to a total amount of the electrolyte solution is in a range from 8.5% by mass to 21% by mass,
wherein the organic carbonate contains at least one of fluoroethylene carbonate or vinylidene carbonate,
wherein the silane coupling agent is a fluoroalkylsilane and the fluoroalkylsilane includes $C_8F_{17}CH_2CH_2$—Si$(OCH_3)_3$,
wherein the organic carbonate is present in a first molar ratio in a range from 1:0.05 to 1:1 relative to the lithium salt, and the water is present in a second molar ratio in a range from 1:1 to 1:2.5 relative to the lithium salt.

2. The secondary battery according to claim 1, wherein the carbon material is hard carbon material.

3. The secondary battery according to claim 1, wherein the silane coupling agent is reductively decomposed at a potential higher than a reductive decomposition potential of water.

4. The secondary battery according to claim 3, wherein a reductive decomposition potential of the silane coupling agent as determined with reference to Li is 2.1 V or higher.

5. The secondary battery according to claim 1, wherein the fluoroalkylsilane additionally includes at least one of $C_5F_{11}CH_2CH_2$—$Si(OCH_3)_3$, and $C_6F_{13}CH_2CH_2$—$Si(OCH_3)_3$.

6. The secondary battery according to claim 1, wherein a content of the silane coupling agent is in a range from 0.01% by mass to 10% by mass relative to a mass of the negative electrode active material.

7. The secondary battery according to claim 1, wherein the lithium salt includes a salt having a lithium ion and an imide anion.

8. The secondary battery according to claim 1, wherein the lithium salt includes lithium bis(trifluoromethanesulfonyl)imide.

9. The secondary battery according to claim 1, wherein the organic carbonate is reductively decomposed at a potential lower than a reductive decomposition potential of the silane coupling agent.

10. The secondary battery according to claim 9, wherein a reductive decomposition potential of the organic carbonate as determined with reference to Li is 2.2 V or lower.

11. The secondary battery according to claim 1, wherein the organic carbonate contains fluorine as a constituent element.

12. The secondary battery according to claim 1, wherein the water is present in a molar ratio in a range from 1.8:0.22 to 2.0:0.03 relative to the organic carbonate.

* * * * *